Jan. 29, 1924.                                                      1,481,856
C. M. CAMPBELL ET AL
MACHINE FOR MAKING COCKS AND FAUCETS
Filed Nov. 20, 1920          6 Sheets-Sheet 5
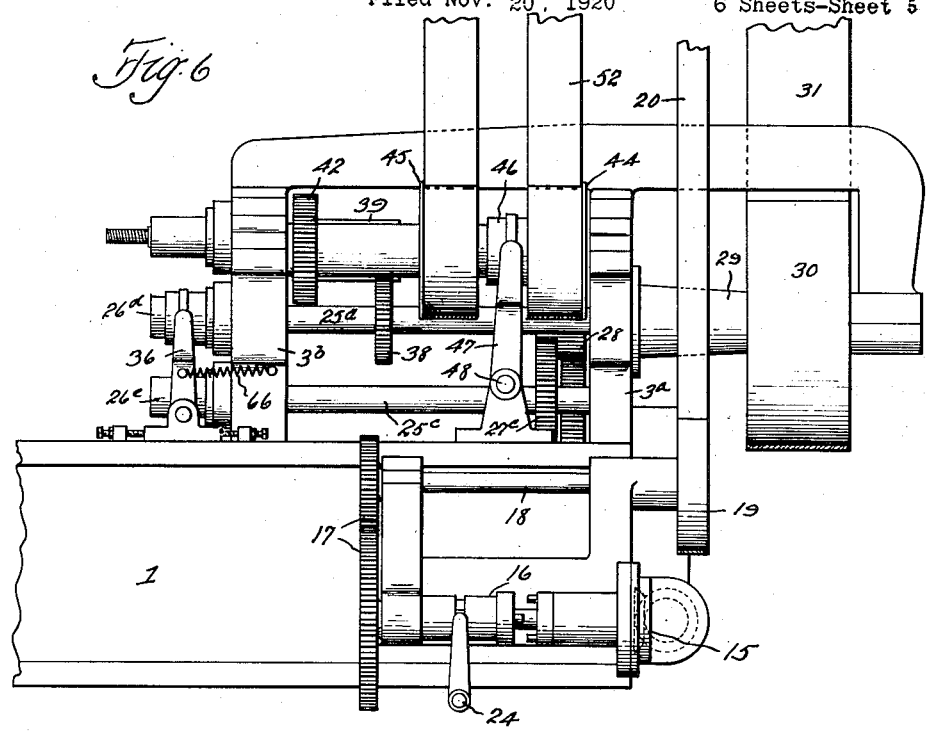
Fig. 6
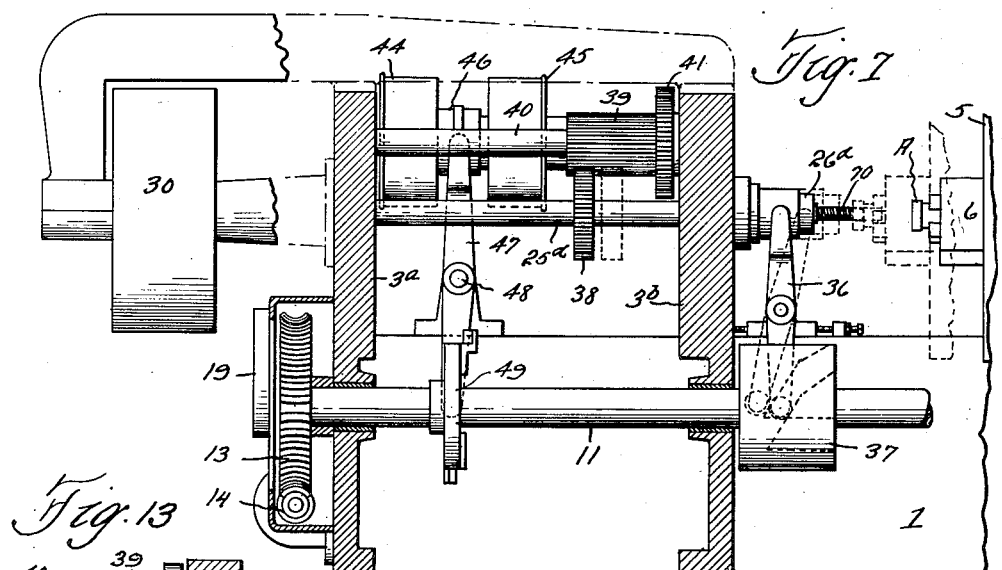
Fig. 7
Fig. 13

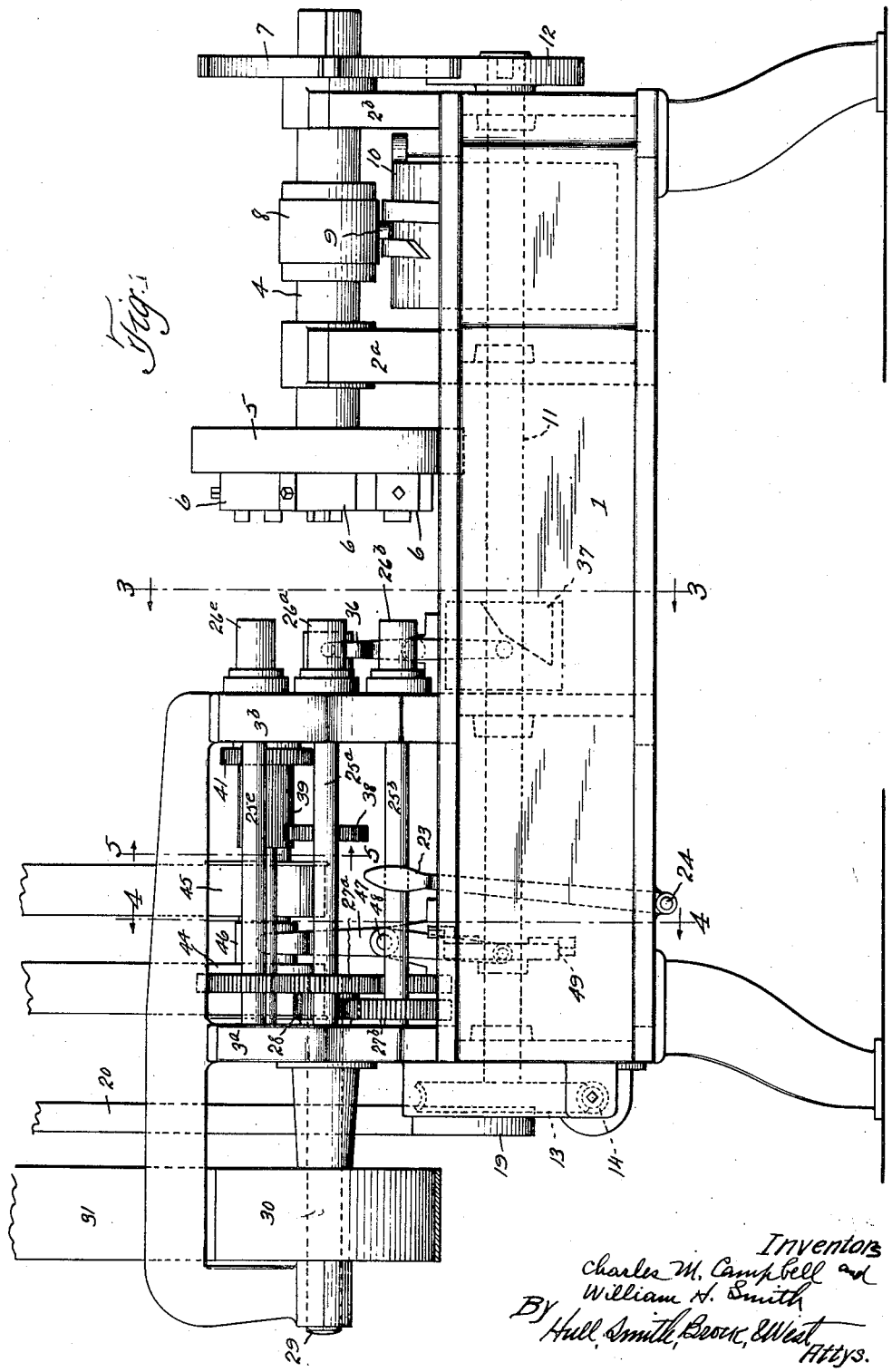

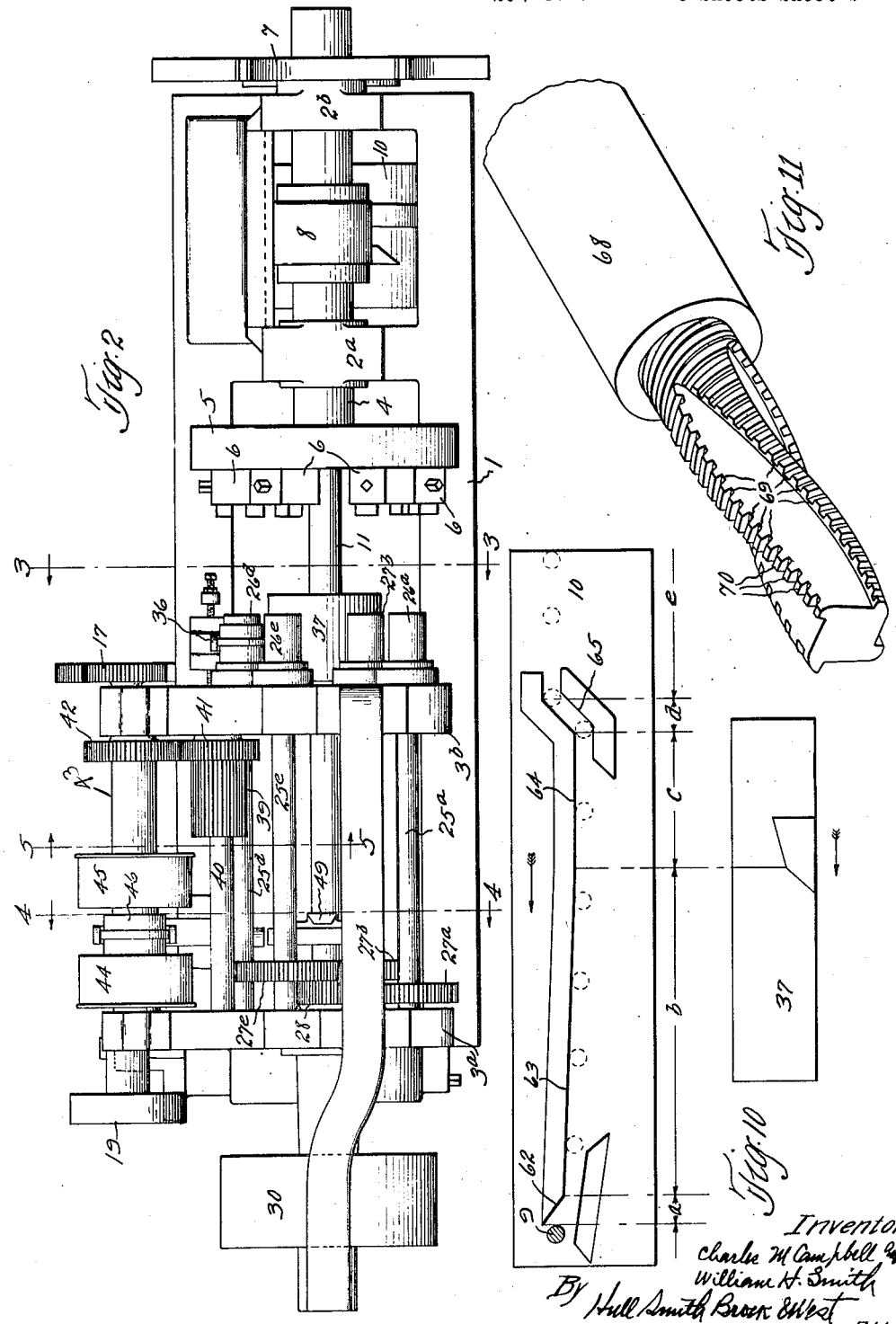

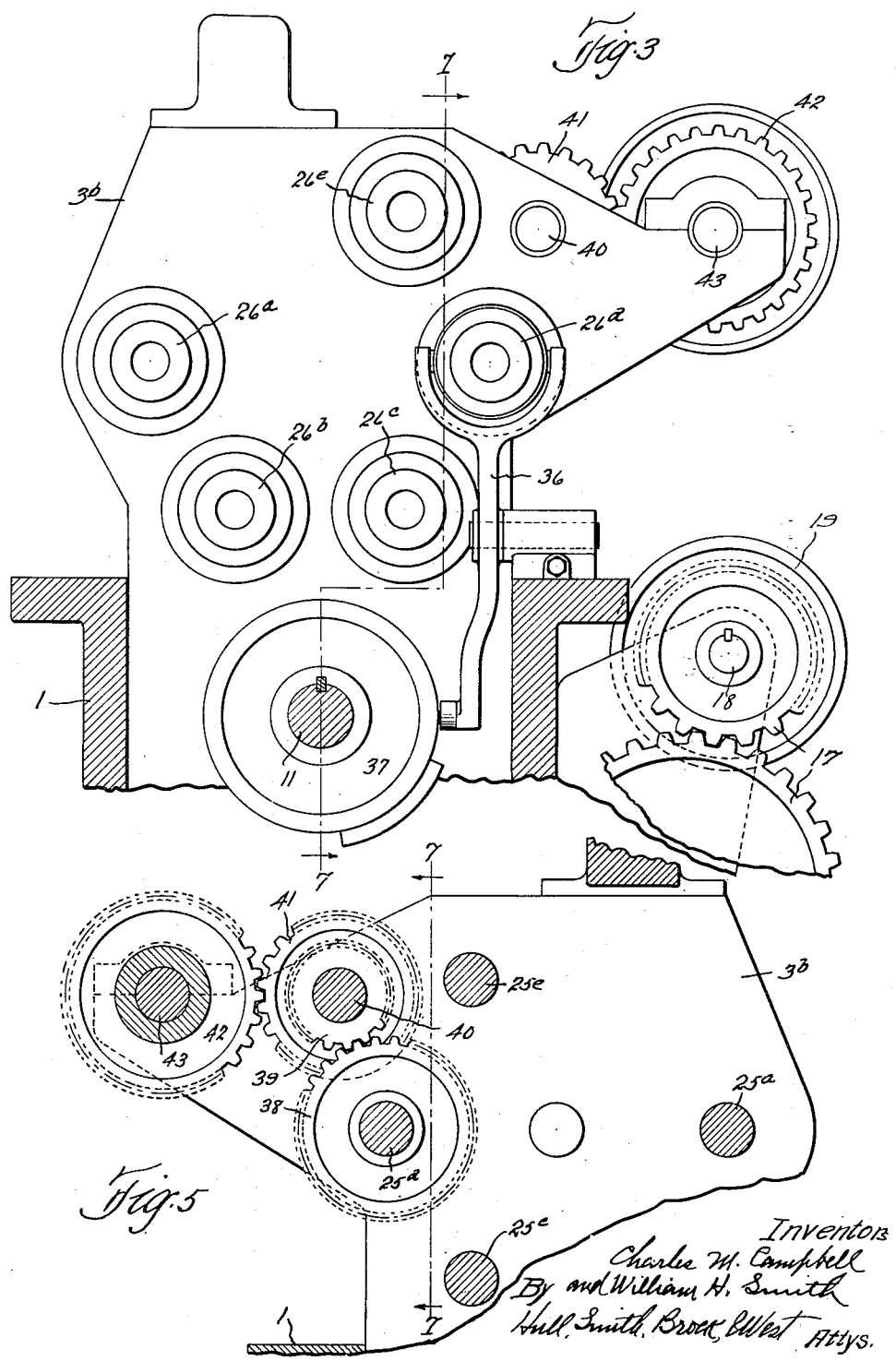

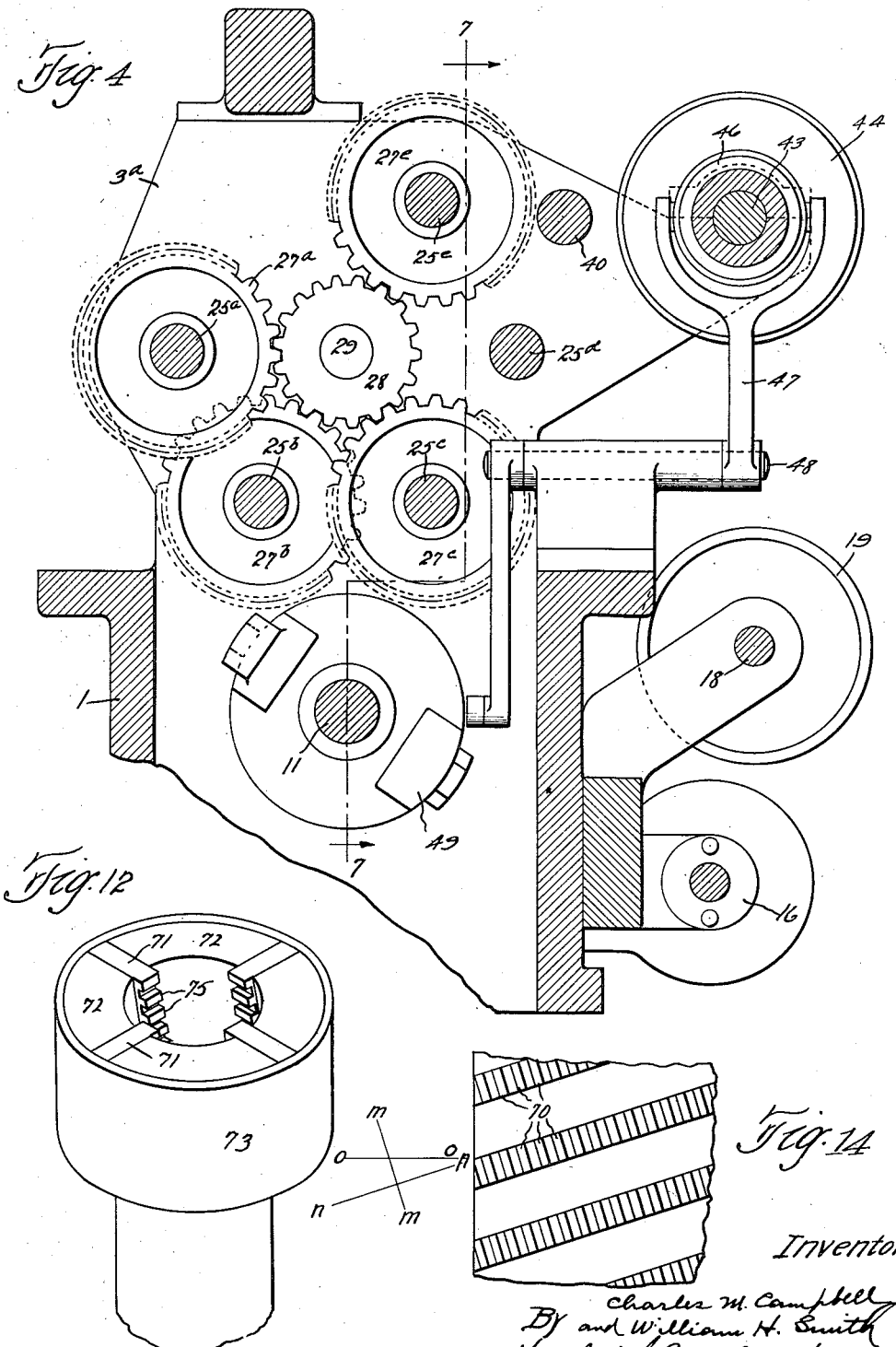

Jan. 29, 1924. 1,481,856
C. M. CAMPBELL ET AL
MACHINE FOR MAKING COCKS AND FAUCETS
Filed Nov. 20, 1920      6 Sheets-Sheet 6
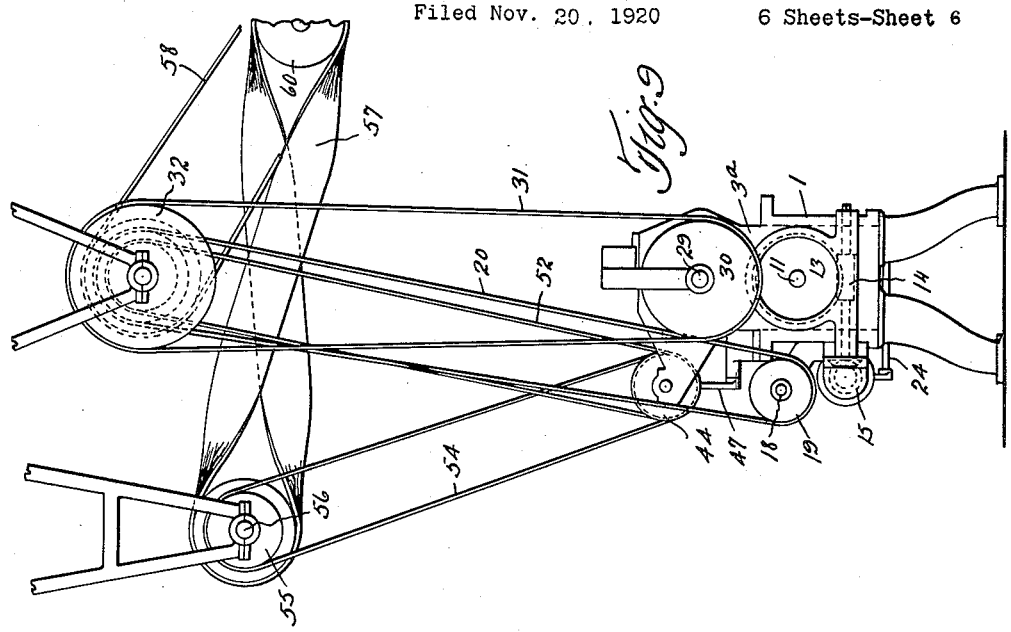
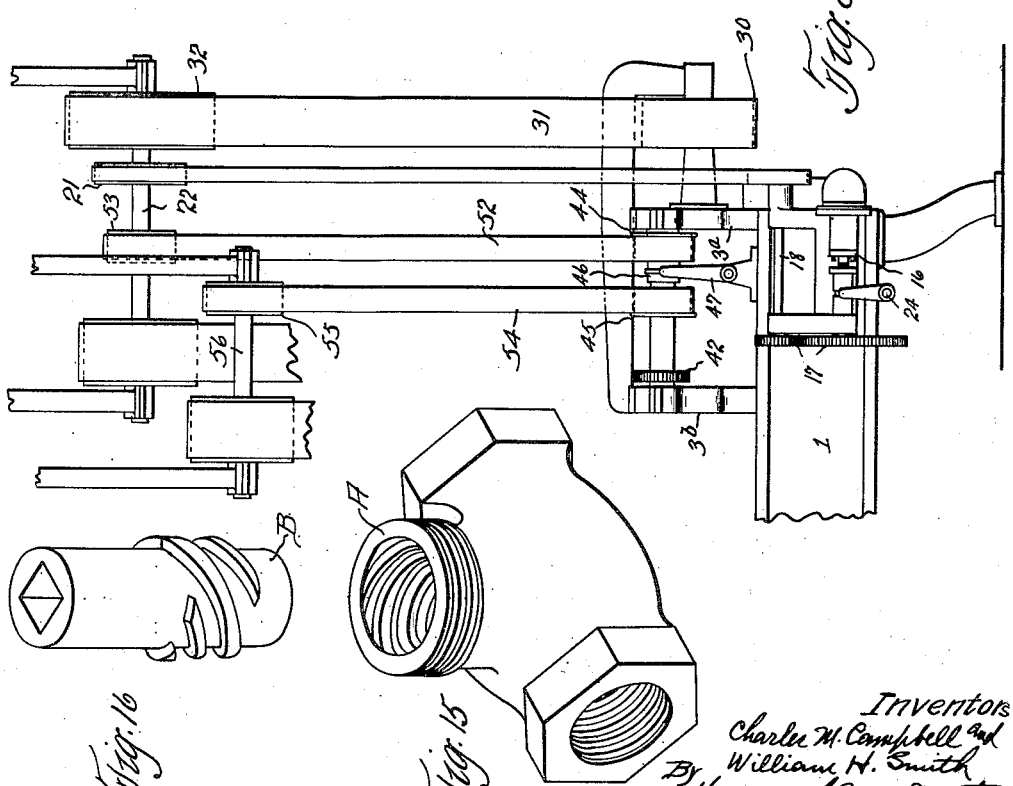
Inventors
Charles M. Campbell and
William H. Smith
By Hull, Smith, Beach & West
Attys.

Patented Jan. 29, 1924.

1,481,856

UNITED STATES PATENT OFFICE.

CHARLES M. CAMPBELL, OF CLEVELAND, AND WILLIAM H. SMITH, OF EAST CLEVELAND, OHIO.

MACHINE FOR MAKING COCKS AND FAUCETS.

Application filed November 20, 1920. Serial No. 425,524.

*To all whom it may concern:*

Be it known that we, CHARLES M. CAMPBELL and WILLIAM H. SMITH, citizens of the United States, residing at Cleveland and East Cleveland, in the county of Cuyahoga and State of Ohio, have invented a certain new and useful Improvement in Machines for Making Cocks and Faucets, of which the following is a full, clear, and exact description, reference being had to the accompanying drawings.

This invention relates to appliances for making a quick thread, either of an internal or an external nature, as is frequently desirable on different mechanical appliances, and finds its maximum use in connection with cocks and faucets for the control and distribution of fluids. In order that such a device may be opened or closed with a small degree of angular movement it has frequently been suggested to employ a multiple thread of steep pitch, but the rapidity of this pitch and the number of multiples has always been limited by the difficulty of manufacture. The objects of our invention are the provision of a new and improved type of thread-cutting tool whereby such threads can be produced expeditiously and by a single operation; the provision of new and improved mechanism for the operation of such a thread-producing tool; and the provision of a combined machine whereby this thread cutting operation can be performed as a single operation, intermingled with other operations necessary to produce the several parts of a cock or faucet; while further objects and advantages of our invention will become apparent as the description proceeds.

In the drawings accompanying and forming a part of this application we have illustrated our improvements in connection with a standard type of machine whereby they can successfully be utilized, although it will be understood that many changes in detail, both of the tools and of the machine can be made within the scope of our invention and are intended to be covered by the annexed claims. In these drawings, Fig. 1 represents a side elevation of a complete machine embodying our improvements; Fig. 2 is a top plan view of the same; Figs. 3, 4 and 5 are cross-sectional views corresponding to the lines 3—3, 4—4 and 5—5 of Figs. 1 and 2; Fig. 6 is a side elevation of the head-end of the machine taken oppositely to that shown in Fig. 1; and Fig. 7 is a detail sectional view corresponding to the broken line 7—7 of Figs. 3, 4 and 5; Figs. 8 and 9 illustrate arrangements of the driving belts; Fig. 10 represents a development of two of the operating cams; Fig. 11 is a perspective view of our improved tool for forming an internal thread; Fig. 12 is a perspective view of our improved tool for forming an external thread; Fig. 13 illustrates the last mentioned tool in place upon the machine; Fig. 14 represents a development of the thread-cutting portions of said tools; Fig. 15 is a perspective view of the valve body as completed upon this machine; and Fig. 16 is a perspective view of the cooperating valve member as thus completed.

Describing by reference characters the parts shown in these drawings, 1 represents the frame of the machine from which arise the four spaced uprights $2^a$, $2^b$, $3^a$, and $3^b$. Journaled in the uprights $2^a$, $2^b$ is the shaft 4 having secured to one end the circular plate 5 provided with a plurality of independently operable chucks 6—6, and having its opposite end slidably mounted in the star wheel 7 of a Geneva movement, said star wheel having a number of points equal to the number of chucks. The number in the present machine is six, but a greater or less number can be employed depending upon the number of operations to be performed. Journaled upon this shaft is the collar 8 having a radial finger 9 which engages the working surfaces of a cam wheel 10 carried by a longitudinal shaft 11 journaled in the frame 1, said shaft also carrying the other member 12 of the Geneva movement. It is this shaft 11 which determines and controls the operation of the entire machine, and the same is driven in any convenient manner, in the present instance by means of a worm gear 13, worm 14, bevel-gears 15, clutch 16, spur-gears 17, lay shaft 18, belt pulley 19, and belt 20, the latter engaging the pulley 21 on the main counter-shaft 22. The clutch 16 is controlled by the hand lever 23 working through the rock shaft 24 which thus controls the whole machine.

Journaled in the uprights $3^a$ and $3^b$ are a plurality of spindles $25^a$, $25^b$, $25^c$, $25^d$, and 25ᵉ, arranged one in line with each of the chucks 6—6, excepting that the number of chucks is preferably one greater than the number of spindles to allow the attendant time to replace a finished valve with an unfinished one. The forward ends of the spindles are provided with tool holding chucks 26ª, 26ᵇ, 26ᶜ, 26ᵈ and 26ᵉ, respectively, and all of said spindles, excepting spindle 25ᵈ, are driven by means of pinions 27ª, 27ᵇ, 27ᶜ, 27ᵉ meshing with a spur gear 28 carried by a central shaft 29 provided with the pulley 30 operated by the belt 31 from the pulley 32 on the same counter-shaft 22. All the foregoing parts are old and standard and their operation is as follows:—The spindles 25ª, 25ᵇ, 25ᶜ, and 25ᵉ, being all set into operation at one time and the chuck plate 5 being positioned by the Geneva movement so that one piece of work, such as a valve body, is opposite each of said spindles, said chuck plate is slowly advanced towards said spindles by the operation of the cam 10 with the result that the respective operations are all performed simultaneously, after which the chuck plate is retracted by the cam, rotated one step by the Geneva movement, and again advanced towards the tools, with the result that as soon as the chuck plate has made one complete rotation each of the articles carried thereby will have had as many operations performed thereon as there are tools carried by the spindles. For example, if the article operated upon be the body of a valve such as is shown in Fig. 15, these operations may be, in succession: 25ª, faces neck A and smooths exterior of same; 25ᵇ reams interior of neck; 25ᶜ prepares valve seat; 25ᵈ cuts the internal thread; 25ᵉ cuts the external thread. If the article operated upon be the valve member shown in Fig. 16 an example of the order of operations is as follows: 25ª faces end of spindle and exterior portion at B; 25ᵇ bores hole for washer screw; 25ᶜ vacant; 25ᵈ forms external thread; 25ᵉ taps hole for washer screw.

The present invention concerns especially the operation of the spindle 25ᵈ and the tools employed therewith. This spindle is not only rotatable, but is also longitudinally movable in its bearings under the influence of the lever 36 operated by the cam 37 on the shaft 11 and is driven in all positions of its adjustment by the gear wheel 38 which meshes with the elongated pinion 39 carried by the shaft 40, which in turn is operated through the spur gears 41, 42 from the reversing shaft 43. Loosely mounted on the shaft 43 are the pulleys 44 and 45, which can be selectively secured thereto by the slidable clutch spool 46 moved by the lever 47 and rock shaft 48 from the cam 49 on the shaft 11. The pulley 44 is connected by the belt 52 with a pulley 53 on the countershaft 22 while the pulley 45 is connected by the belt 54 with a pulley 55 on another countershaft 56 which rotates in the opposite direction from the countershaft 22 as is indicated by the relation between the cross belt 57 and straight belt 58 by means of which both of these shafts are driven from the prime mover 60.

The relation of the various controlling devices carried by the shaft 11 requires special mention. Fig. 10 illustrates a development of the cams 10 and 37 drawn to the same scale and located in the proper relative position. Starting with the chuck plate 5 in its most retracted position, the rotation of the cam 10 first brings the inclined portion 62 into engagement with the finger 9, advancing the work quickly to a point near the ends of the tools, this taking place through an angular movement indicated at $a$ in Fig. 10. The slant of the cam now becomes more gradual as shown at 63 and causes a feeding of the work to the tools at the rate best suited for the same throughout the angular extent indicated at $b$. As soon as the point of greatest advance has been reached the slant of the cam becomes zero as shown at 64 and continues such throughout the angular rotation shown at $c$, thus providing a dwell during which time the cam 37 comes into operation, advancing the threading tool into the work and afterwards permitting its complete retraction before the end of such period of dwell. The cam 10 next presents a quickly sloping portion 65 which serves to withdraw the plate 5 to its maximum extent during the angular rotation indicated at $d$ which position it retains throughout the remainder of the revolution indicated at $e$, and it is during this last period that the Geneva gear rotates said plate a single step forward. The cam 49 is arranged in exact synchronism with the cam 37 so as to clutch the pulley 44 to its shaft and drive the spindle 25ᵈ forwardly during the forward movement thereof, and to shift said clutch into engagement with the pulley 45 and reverse that movement immediately that its position of greatest advance is reached. In the present embodiment, we have shown this spindle as retracted by the action of the spring 66 operating in conjunction with the slant of the newly formed threads, though this, like many other features of the machine is subject to change.

The tool for the production of the internal threads is illustrated particularly in Fig. 11 and consists of a shank 68, having a cylindrical surface 69 from which project radially a plurality of cutting teeth 70 arranged in rows, such rows being arranged helically around the tool axis in such wise that the direction of the rows shall be everywhere perpendicular to the pitch of the threads. This means that the teeth further from the point of the tool are advanced ahead of those which are nearer the point. The cutting faces of the teeth are parallel to the length of the rows, thus enabling the tools to be ground by grinding the faces of the rows, and the development of the tool exterior is shown in Fig. 14, wherein *m—m* represents the slope of the threads and *n—n* the slope of the row, *o—o* being the axis of tool.

The tool for cutting external threads is illustrated in Fig. 12 and comprises a plurality of toothed cutters 71, 71 alternating with filler blocks 72—72 inside the cylindrical shell 73. The cutters 71 have their inner edges provided with cutting teeth 75 similar to the teeth 70 which, when assembled as shown, project radially inwardly from the cylindrical surface defined by the blocks 72 and are arranged around the axis of the tool in exactly the same manner as before so that the development of the tool interior is identical with that of the exterior of the first tool and is accurately represented by Fig. 14. As a result of this construction the cutting faces of the teeth, both of the internal tool and of the external tool, are square and end thrust is eliminated.

It is essential to the successful operation of this tool that it be forcibly advanced during the entire cutting operation at the same speed as that required by the speed of its revolution and the pitch of its thread, since it does not, like the usual tap and die, possess the ability of providing its own advancing movement. Accordingly the slope of the working portion of the cam 37 is so chosen relatively to the relative speeds of the shaft 11 and spindle 25$^d$ and the pitch of the threads as to accomplish this result. Also it is essential that the advancing movement of this tool be terminated at exactly the same instant as its rotative movement.

It will be understood that we do not limit ourselves to this particular arrangement of mechanical elements for producing this result, but merely offer the same as a simple mode of converting an existing machine to perform this new and useful operation. It will be understood that the driving arrangements are subject to especially great variations, such as the substitution of gearing for belting and a great simplification in power connections. In the present embodiment we have illustrated the threading tools and machine as arranged for the production of a quadruple pitched thread, but do not limit ourselves thereto; we have also illustrated the same as specially adapted for producing a simple compression stop cock, although it can be employed for making any kind of a valve or faucet, or any other type of device that requires this kind of a thread. It will also be understood that our improved threading tool can be used with any kind of a machine fitted to produce a forward movement of the same at the same rate as that indicated by its pitch, and regardless as to what if any other operations are performed by the machine. And in general it will be understood that we do not limit ourselves to any details of construction of any parts of these machines or tools, except as hereinafter specifically recited in our claims nor to any combinations except as distinctly limited by said claims, asserting in addition all lawful rights of substitution and equivalence.

Having thus described our invention, what we claim is:

1. A machine for making cocks and faucets comprising, in combination, a plate having thereon a plurality of circularly arranged chucks, a plurality of circularly arranged, tool-carrying spindles, all of said spindles being rotatable and one of the same being also longitudinally slidable, a thread cutting tool carried by said last mentioned spindle, means for rotating said plate in an intermittent manner, means for advancing it longitudinally toward said spindles in the intervals of its rotation so as to bring the articles held in said chucks into engagement with those tools which have rotational movement only, said last means being arranged to provide a period of dwell when said plate has reached its point of maximum advance, means operative during such period of dwell to rotate said slidable spindle and simultaneously to advance it toward said plate at a rate equal to the pitch of the thread cut by its tool, means for stopping the rotation and advance of said slidable spindle at the same instant, and means for reversing the rotation of said slidable spindle and screwing said tool out of the article during such period of dwell, and means for thereafter retracting said plate.

2. A machine for the purpose described, comprising, in combination, a plate having thereon a plurality of circularly arranged chucks, a plurality of circularly arranged tool-holding spindles, all of which are rotatable and one of which is slidable, means for rotating said last spindle in both directions, a tool carried by said last spindle for cutting a multiple thread, means for rotating the remaining spindles in one direction, a cam shaft, intermittent gearing between said cam-shaft and plate, a cam on said cam shaft adapted and arranged to reciprocate said plate toward and from said spindles during the intervals between the rotational movements of said plate, said cam being arranged to hold said plate stationary for a dwell period at its position of maximum advance, a second cam carried by said cam shaft adapted to connect the forward-rotating means to said slidable spindle at the beginning of said dwell period, a third cam on said cam shaft adapted to advance said slidable spindle toward said plate throughout the thread cutting operation at a rate equal to the pitch of the thread, and cam means for disconnecting such forward rotating means from said spindle at the same instant that said third cam stops the advance of said spindle, and for connecting the reverse-rotating means to said spindle so as to retract said spindle before the end of said dwell period.

In testimony whereof, we hereunto affix our signatures.

CHARLES M. CAMPBELL.
WILLIAM H. SMITH.